United States Patent
Kuenzi et al.

(10) Patent No.: US 12,148,254 B2
(45) Date of Patent: Nov. 19, 2024

(54) VOICE ACTIVATED REAL ESTATE ACCESS CONTROL

(71) Applicant: Carrier Corporation, Palm Beach Gardens, FL (US)

(72) Inventors: Adam Kuenzi, Silverton, OR (US); Jay Corporon, Gresham, OR (US); Teri Briskey, Monmouth, OR (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 264 days.

(21) Appl. No.: 17/568,860

(22) Filed: Jan. 5, 2022

(65) Prior Publication Data
US 2022/0222990 A1 Jul. 14, 2022

Related U.S. Application Data (60) Provisional application No. 63/136,391, filed on Jan. 12, 2021.

(51) Int. Cl.
*G07C 9/00* (2020.01)
*G10L 15/22* (2006.01)
*G10L 15/30* (2013.01)

(52) U.S. Cl.
CPC .......... *G07C 9/00563* (2013.01); *G10L 15/22* (2013.01); *G10L 15/30* (2013.01); *G10L 2015/223* (2013.01)

(58) Field of Classification Search
CPC ............ G07C 9/00563; G07C 9/00896; G07C 9/00023; G10L 15/22; G10L 15/30; G10L 2015/223; G06F 17/30035
See application file for complete search history.

(56) References Cited

U.S. PATENT DOCUMENTS

| | | | |
|---|---|---|---|
| 6,472,973 B1 | 10/2002 | Harold | |
| 9,852,487 B1 | 12/2017 | Farnsworth | |
| 10,484,389 B2 | 11/2019 | Rovito et al. | |
| 2005/0086158 A1 | 4/2005 | Clare | |
| 2006/0106628 A1 | 5/2006 | Faherty et al. | |

(Continued)

FOREIGN PATENT DOCUMENTS

| | | |
|---|---|---|
| CN | 108536680 A | 9/2018 |
| CN | 109472905 A | 3/2019 |

(Continued)

OTHER PUBLICATIONS

Author Unknown, "Talk to the House", Amazon.com; https://www.amazon.com/Talk-To-The-House/dp/B07518KSZX.

(Continued)

*Primary Examiner* — Vernal U Brown
(74) *Attorney, Agent, or Firm* — CANTOR COLBURN LLP (57) ABSTRACT

A method of providing real estate access control includes receiving a voice input at a voice assistant unit; sending the voice input from the voice assistant unit to a language processing system; at the language processing system, processing the voice input to define a message; sending the message from the language processing system to a locking device management system; at the locking device management system, processing the message as one of a command to a locking device and a query regarding the locking device.

11 Claims, 8 Drawing Sheets

(56) References Cited

U.S. PATENT DOCUMENTS

| | | | |
|---|---|---|---|
| 2017/0372542 | A1 | 12/2017 | Romero et al. |
| 2018/0062870 | A1 | 3/2018 | Rovito et al. |
| 2019/0080371 | A1 | 3/2019 | Spath |
| 2020/0168015 | A1 | 5/2020 | Rosenberg et al. |
| 2020/0193537 | A1 | 6/2020 | Beatty et al. |
| 2022/0043986 | A1* | 2/2022 | Nell .................. G10L 15/22 |

FOREIGN PATENT DOCUMENTS

| | | |
|---|---|---|
| KR | 200432954 Y1 | 12/2006 |
| KR | 102144493 B1 | 8/2020 |

OTHER PUBLICATIONS

Author Unknown; "Alexa, Lock the Front Door"—Control your smart locks with your voice; Kwikset Smart Security Blog; https://www.smartsecurityblog.com/control-your-smart-locks-with-your-voice/.

Author Unknown; "Populife: A Smark Key Box with Bluetooth & Remote App Control"; Kickstarter; date unknown; https://www.kickstarter.com/projects/populifekeybox/populife-a-smart-key-box-with-bluetooth-and-remote-app-control.

Author Unknown; "Lockly Vision Doorbell Camera Smart Lock"; Lockly; https://lockly.com/products/lockly-vision-doorbell-camera-smart-lock.

Author Unknown; "MLS Policy Changes on Lockboxes, IDX"; National Association of Realtors; Realtor AE Magazine; Summer 2017; https://www.nar.realtor/realtor-ae-magazine/mls-policy-changes-on-lockboxes-idx.

Author Unknown; "Notifications of Door Open eg Alexa"; Smart-Things; Nov. 2018; https://community.smartthings.com/t/notifications-of-door-open-eg-alexa/144074.

* cited by examiner

VOICE ACTIVATED REAL ESTATE ACCESS CONTROL

CROSS-REFERENCE TO RELATED APPLICATIONS

This application claims the benefit of U.S. Provisional Application No. 63/136,391, filed Jan. 12, 2021, the entire contents of which are incorporated herein by reference.

BACKGROUND

The subject matter disclosed herein generally relates to real estate access control and, more particularly, to real estate access control using a voice activated assistant.

Access to real estate for sale may be achieved using locking devices, such as a lock box that contains a physical key to the property or an electronic lock (e.g., a smart lock). Typically, a real estate agent will manage the locking device by setting unlock codes, setting features of the locking device (e.g., call before showing), etc. There exists systems to improve access to locking devices, such as U.S. Pat. No. 9,330,514, which is incorporated herein by reference.

SUMMARY

According to an embodiment, a method of providing real estate access control includes receiving a voice input at a voice assistant unit; sending the voice input from the voice assistant unit to a language processing system; at the language processing system, processing the voice input to define a message; sending the message from the language processing system to a locking device management system; at the locking device management system, processing the message as one of a command to a locking device and a query regarding the locking device.

In addition to one or more of the features described herein, or as an alternative, further embodiments of the method may include when the message is the command to the locking device, the locking device management system generating a credential including programming for the locking device.

In addition to one or more of the features described herein, or as an alternative, further embodiments of the method may include the locking device management system sending the credential to a mobile device.

In addition to one or more of the features described herein, or as an alternative, further embodiments of the method may include the mobile device transferring the credential to the locking device.

In addition to one or more of the features described herein, or as an alternative, further embodiments of the method may include the mobile device sending an acknowledgment of programming of the credential by the locking device to the locking device management system.

In addition to one or more of the features described herein, or as an alternative, further embodiments of the method may include the locking device management system sending the acknowledgment of programming of the credential by the locking device to the language processing system.

In addition to one or more of the features described herein, or as an alternative, further embodiments of the method may include the language processing system sending the acknowledgment of programming of the credential by the locking device to the voice assistant unit.

In addition to one or more of the features described herein, or as an alternative, further embodiments of the method may include when the message is the query regarding the locking device, the locking device management system accessing a locking device information database; the locking device management system generating a query response in response to accessing the locking device information database.

In addition to one or more of the features described herein, or as an alternative, further embodiments of the method may include the locking device management system sending the query response to the language processing system.

In addition to one or more of the features described herein, or as an alternative, further embodiments of the method may include the language processing system sending the query response to the voice assistant unit.

According to another embodiment, a system of providing real estate access control includes a language processing system configured to receive a voice input from a voice assistant unit; the language processing system configured to process the voice input to define a message; a locking device management system configured to receive the message from the language processing system; the locking device management system configured to process the message as one of a command to a locking device and a query regarding the locking device.

In addition to one or more of the features described herein, or as an alternative, further embodiments of the system may include when the message is the command to the locking device, the locking device management system generating a credential including programming for the locking device.

In addition to one or more of the features described herein, or as an alternative, further embodiments of the system may include the locking device management system sending the credential to a mobile device.

In addition to one or more of the features described herein, or as an alternative, further embodiments of the system may include the mobile device transferring the credential to the locking device.

In addition to one or more of the features described herein, or as an alternative, further embodiments of the system may include the mobile device sending an acknowledgment of programming of the credential by the locking device to the locking device management system.

In addition to one or more of the features described herein, or as an alternative, further embodiments of the system may include the locking device management system sending the acknowledgment of programming of the credential by the locking device to the language processing system.

In addition to one or more of the features described herein, or as an alternative, further embodiments of the system may include the language processing system sending the acknowledgment of programming of the credential by the locking device to the voice assistant unit.

In addition to one or more of the features described herein, or as an alternative, further embodiments of the system may include when the message is the query regarding the locking device, the locking device management system accessing a locking device information database; the locking device management system generating a query response in response to accessing the locking device information database.

In addition to one or more of the features described herein, or as an alternative, further embodiments of the system may include the locking device management system sending the query response to the language processing system.

According to another embodiment, a computer program product for providing real estate access control, the computer program product includes a non-transitory computer readable storage medium having program instructions embodied therewith, the program instructions executable by a processor to cause the processor to implement operations comprising: receiving a voice input at a voice assistant unit; sending the voice input from the voice assistant unit to a language processing system; at the language processing system, processing the voice input to define a message; sending the message from the language processing system to a locking device management system; at the locking device management system, processing the message as one of a command to a locking device and a query regarding the locking device.

Technical effects of embodiments of the present disclosure include providing access to one or more locking devices using verbal commands/queries.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The present disclosure is illustrated by way of example and not limited in the accompanying figures in which like reference numerals indicate similar elements.

DETAILED DESCRIPTION

Figure 1:
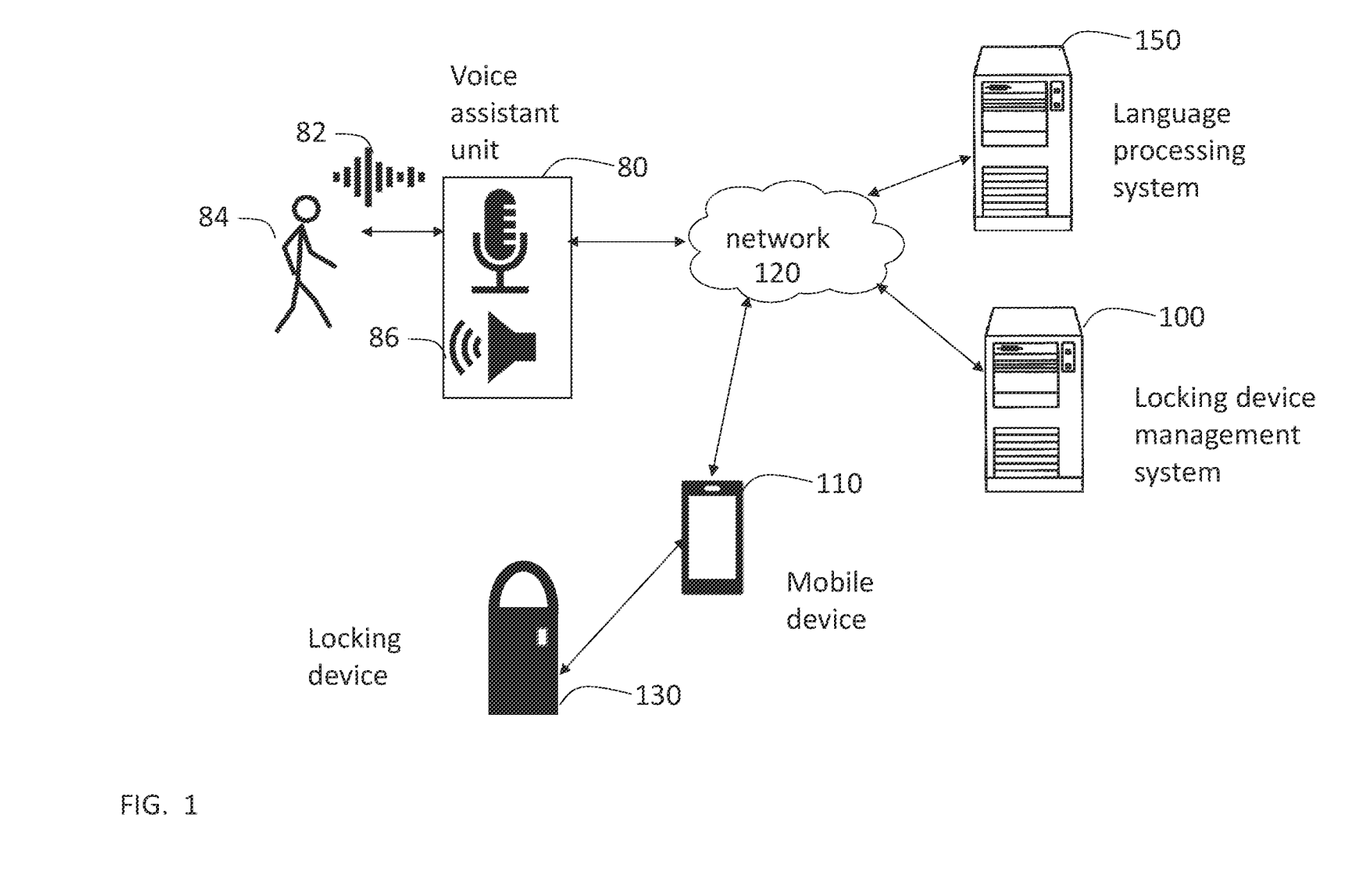
FIG. 1 depicts a system for providing real estate access control using a voice activated assistant in an example embodiment.

FIG. 1 depicts a system for providing real estate access control using a voice activated assistant in an example embodiment. The system includes a voice assistant unit 80 that receives a voice input 82 from a user 84. The voice assistant unit 80 may also generate an audible output 86. The voice assistant unit 80 may be implemented using known voice processing devices, such as Amazon™ Alexa™, Google™ Home Assistant, Apple™ Siri™, etc. The voice assistant unit 80 is in communication with a network 120.

Network 120 provides for communication between various elements of the system of FIG. 1. The network 120 may be implemented via one or more wired/wireless networks, such as, but are not limited to, one or more of WiMax, a Local Area Network (LAN), Wireless Local Area Network (WLAN), a Personal area network (PAN), a Campus area network (CAN), a Metropolitan area network (MAN), a Wide area network (WAN), a Wireless wide area network (WWAN), or any broadband network, and further enabled with technologies such as, by way of example, Global System for Mobile Communications (GSM), Personal Communications Service (PCS), Bluetooth, WiFi, Fixed Wireless Data, 2G, 2.5G, 3G (e.g., WCDMA/UMTS based 3G networks), 4G, IMT-Advanced, pre-4G, LTE Advanced, mobile WiMax, WiMax 2, WirelessMAN-Advanced networks, enhanced data rates for GSM evolution (EDGE), General packet radio service (GPRS), enhanced GPRS, iBurst, UMTS, HSPDA, HSUPA, HSPA, HSPA+, UMTS-TDD, 1xRTT, EV-DO, messaging protocols such as, TCP/IP, SMS, MMS, extensible messaging and presence protocol (XMPP), real time messaging protocol (RTMP), instant messaging and presence protocol (IMPP), instant messaging, USSD, IRC, or any other wired/wireless data networks, broadband networks, or messaging protocols.

A language processing system 150 is in communication with the network 120. The language processing system 150 may be embodied as any type of processor-based computation or computer device capable of performing the functions described herein, including, without limitation, a computer, a server, a workstation, a desktop computer, a laptop computer, a notebook computer, a tablet computer, a mobile computing device, a wearable computing device, a network appliance, a web appliance, a distributed computing system (e.g., cloud computing), a processor-based system, and/or a consumer electronic device. In other embodiments, the language processing system 150 is embodied in the voice assistant unit 80.

A locking device management system 100 is in communication with the network 120. The locking device management system 100 may be embodied as any type of processor-based computation or computer device capable of performing the functions described herein, including, without limitation, a computer, a server, a workstation, a desktop computer, a laptop computer, a notebook computer, a tablet computer, a mobile computing device, a wearable computing device, a network appliance, a web appliance, a distributed computing system (e.g., cloud computing), a processor-based system, and/or a consumer electronic device.

Mobile device 110 represents any type of mobile computing device capable of communicating with the locking device management system 100 via network 120 and, additionally, capable of communicating with a locking device 130. The locking device 130 may be a lockbox or an electronic lock, as described further herein. Although mobile device 110 is depicted in FIG. 1 as a single device, in some embodiments, mobile device 110 can represent a plurality of mobile devices capable of communicating with locking device management system 100 and locking device 130.

In embodiments, mobile device 110 can communicate with locking device 130 via a signal 115. Signal 115 can represent various forms of wireless signals including, but not limited to, Bluetooth, infrared, Near Field Communication (NFC), Wi-Fi, Zigbee, and other radio signals. Accordingly, mobile device 110 can communicate with locking device 130 when mobile device 110 and locking device 130 are a distance to communicate by Bluetooth, infrared, NFC, Wi-Fi, Zigbee, or other radio signals. Additionally, in embodiments, information communicated between mobile device 110 and locking device 130 can be encrypted and decrypted using one or more encryption methods, such as Triple Data Encryption Standard (3DES), Advanced Encryption Standard (AES), RSA, Elliptic curve cryptography (ECC), etc.

Locking device 130 represents any type of device capable of fastening and/or controlling access, and locking device 130 can include mechanical and electrical components. Additionally, locking device 130 can receive signals from and transfer signals to mobile device 110. Although locking device 130 is depicted in FIG. 1 as a single device, in some embodiments, locking device 130 can include a plurality of interconnected devices capable of performing the functions discussed herein. Additionally, in further embodiments, locking device 130 can represent a plurality of locking devices capable of receiving signals from and transferring signals to mobile device 110.

In some embodiments, locking device 130 can be configured to request and/or verify digital certificate information from mobile device 110. Additionally, in certain implementations, locking device 130 can be configured to decrypt information received from mobile device 110 and encrypt information sent to mobile device 110.

Figure 2:
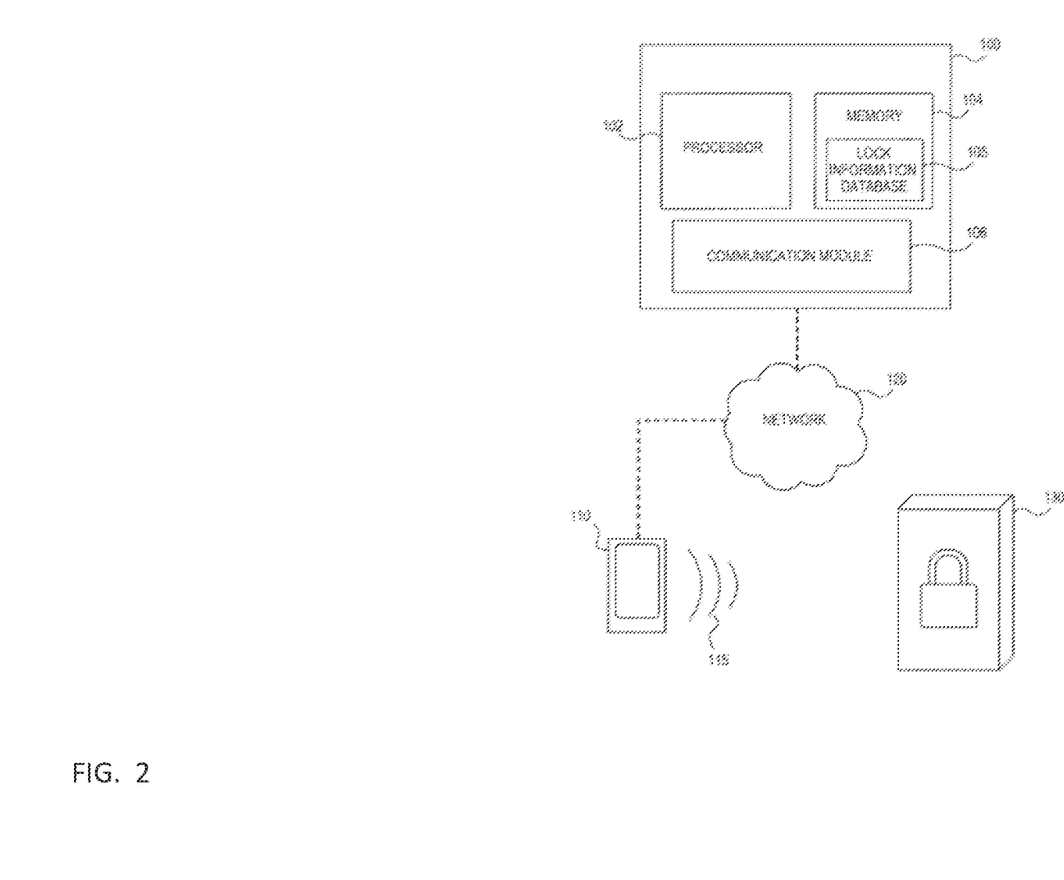
FIG. 2 depicts a locking device management system, mobile device and locking device in an example embodiment.

FIG. 2 depicts a locking device management system 100, network 120, mobile device 110 and locking device 130 in an example embodiment. Locking device management system 100 can include a processor 102 communicating with a memory 104, such as electronic random access memory, or other forms of transitory or non-transitory computer readable storage mediums. Memory 104 can include a locking device information database 105. Locking device information database 105 can be utilized to store locking device status information, locking device identifier information, mobile device identifier information, digital certificate information, etc. In some implementations, mobile device identifier information can include mobile device numbers, international mobile subscriber identity (IMSI) information, subscriber identity module (SIM) information, etc.

Processor 102 can execute control logic and perform data processing to perform the functions and techniques as discussed herein. For example, processor 102 can process locking device programming triggers and retrieve and set locking device status and identifier information in locking device information database 105. Further, in embodiments, processor 102 can generate reports based on locking device status information stored in locking device information database 105.

Processor 102 can be connected to, provide commands to, and receive information from communication module 106. Locking device management system 100 can utilize communication module 106 to communicate with mobile device 110 via network 120. For example, communication module 106 can include a server-side network protocol application.

In embodiments, processor 102 can be configured to generate one or more locking device programming triggers. A locking device programming trigger can include a change in ownership of one or more locking devices. An administrator accessing locking device management system 100 can add, remove, and transfer ownership of one or more locking devices, causing a locking device programming trigger. In certain embodiments, ownership of a set of locks can be tied to ownership of a building containing the set of locks. Upon a change of ownership of the building, ownership of the locking devices can likewise be changed, which may necessitate reprogramming the device with a new owner identifier, encryption keys, or other locking device settings that pertain specially to the owner.

Additionally, a locking device programming trigger can include changing a list of approved users for one or more locking devices and/or changing levels of access of one or more users. An administrator can add users to or remove users from a list of approved users for a single locking device or for a set of locking devices. Additionally, different users may be granted different levels of access to specified locking devices, and such levels of access can be edited by an administrator. For example, a first user can be identified as an administrative user and be granted access to a set of locking devices in a building at all times, while a second user can be identified as a restricted user and only be granted access to a set of locking devices for a specified period of time.

Further, a locking device programming trigger can include changes to lock parameters. For example, an administrator can set the time zone of a lock, change the mode of operation of a locking device, such as change the mode of operation to latch open or auto-relock, set the duration of time to hold the locking device open, set configuration instructions for a locking device to remain open during specified periods of time, or set specified periods of time for restricted users. Any changes to the lock parameters of one or more locks can cause a locking device programming trigger.

Once a locking device programming trigger is recognized, processor 102 can select, automatically or as directed by an administrator, one or more mobile devices, including mobile device 110, to transfer programming instructions. For example, processor 102 can identify that mobile device 110 is associated with a locking device user classified as an installer for a desired locking device or processor 102 can identify that mobile device 110 has permission to access the desired locking device. Accordingly, processor 102 can transfer programming instructions to mobile device 110 using communication module 106.

In some embodiments, transferring or sending locking device programming instructions to mobile device 110 may be done by mobile device 110 first initiating communication with locking device management system 100 to request or pull queued locking device programming instructions.

In some embodiments, processor 102 can additionally send one or more digital certificates to mobile device 110. The one or more digital certificates can be utilized by mobile device 110 to transfer to the locking device and verify that mobile device 110 has been approved to transfer programming instructions. The digital certificates and locking device programming instructions can include data that can be processed by a processor 102. The data may include a locking device 130 unique identifier or a locking device 130 owner unique identifier, either of which may be used to identify the specific lock or set of locks for which the locking device programming instructions are targeted. The data may further include a programming identifier that is unique to the programming transaction to provide traceability throughout the programming process. The data may include an expiration date when the locking device programming instruction is set to expire or to identify newer instructions that supersede older instructions. Further, the data may include actual programming instructions, such as address, length, value objects that specify how to change the memory contents of the locking device 130. Or, the data may include a special command that, when executed by the locking device 130, effects a programming operation. The data may be encrypted and may include a digital signature that ensures the integrity of the locking device programming instruction in a way that the locking device 130 can verify.

In embodiments, communication module 106 can utilize cryptographic protocols to prevent unauthorized access to locking device management system 100 and to ensure that mobile device 110 is authorized to receive locking device programming instructions. Additionally, in embodiments, communications and information exchanged between locking device management system 100 and mobile device 110 can be encrypted and decrypted using one or more encryption methods.

Figure 3:
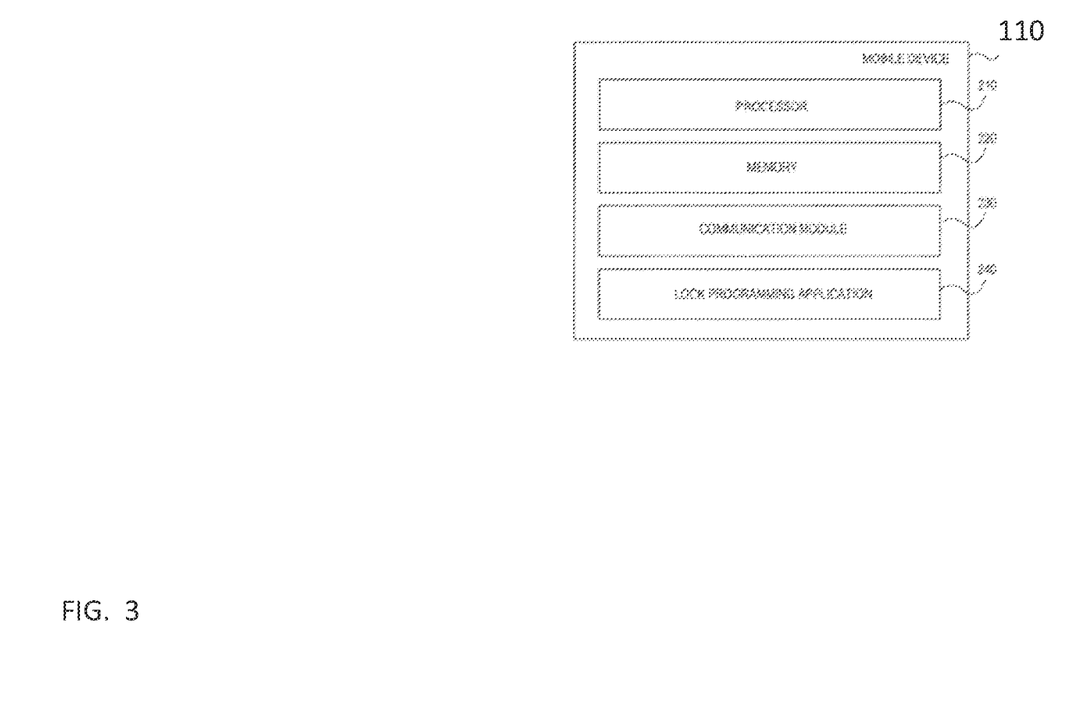
FIG. 3 depicts a mobile device in an example embodiment.

As shown in FIG. 3, mobile device 110 can include a processor 210 communicating with a memory 220, such as electronic random access memory, or other forms of transitory or non-transitory computer readable storage mediums. Processor 210 can further communicate with communication module 230, which in turn can communicate with a wide area network, such as various public or private networks, telecommunications networks, and/or via wireless signals. More particularly, the wide area network can connect mobile device 110 to one or more locking device management system, such as locking device management system 100, as discussed with respect to FIG. 1, and/or other components. Additionally, mobile device 110 can communicate with one or more locking devices, such as locking device 130, as discussed with respect to FIG. 1, via wireless signals, such as an infrared or Bluetooth signal.

Processor 210 can execute control logic and perform data processing to perform functions and techniques as discussed herein. For example, processor 210 can install and/or execute a locking device programming application 240. In some embodiments, locking device programming application 240 may be a part of a general access control application for opening locking devices. Further, locking device programming application 240 can be configured to receive locking device programming instructions for one or more locking devices from a locking device management system 100. Additionally, in embodiments, locking device programming application 240 can be configured to store, using memory 220, locking device identifier information and/or digital certificate information for communicating with the one or more locking devices.

In embodiments, upon receipt of locking device programming instructions, locking device programming application 240 can utilize communication module 230 to transmit a wireless signal to search for specified locking devices. In some embodiments, locking device programming application 240 can search for the specified locking devices automatically, while, in further embodiments, locking device programming application 240 can require instructions from a user of mobile device 200 before such wireless signals are transmitted.

Automatic searching can be performed based on known GPS locations of locking devices, where the locking device programming application initiates communication on arriving at a pre-determined location. Further, automatic search can be a periodic search that happens continuously until a lock responds. Additionally, a user instruction for initiating a search for specified locking devices could be the same operation that a user would initiate normally to open a locking device, such as an open command to locking device programming application 240. In some implementations, the programming operation could happen automatically during the normal locking device open sequence without the user's knowledge, while, in further embodiments, the programming operation could occur without any instructions from the user.

Once locking device programming application 240 receives a confirmation signal back from a specified locking device, locking device programming application 240 can transmit locking device programming instructions and/or digital certificates to the locking device. In some embodiments, locking device programming application can transmit, using communication module 230, the locking device programming instructions and/or digital certificates to the locking device automatically, while, in further embodiments, locking device programming application 240 can require instructions from a user of mobile device 110 before any information is transmitted.

In certain implementations, locking device programming application 240 can be configured to receive multiple sets of programming instructions for various different locking devices. Additionally, locking device programming application 240 can be configured to discard expired programming instructions and/or non-current programming instructions. For example, programming instructions can be specified to be transferred within a certain time window, for example, one week. If the programming instructions are not transferred to the specified locking device by the end of the time window, the programming instructions can be discarded. Further, as an additional example, locking device programming application 240 can discard locking device programming instructions for a specified locking device upon receipt of more recent locking device programming instructions for the same locking device.

In some embodiments, once locking device programming application 240 transmits locking device programming instructions to and receives a confirmation status from a specified locking device, locking device programming application 240 can transfer a confirmation status back to a locking device management system 100.

Figure 4:
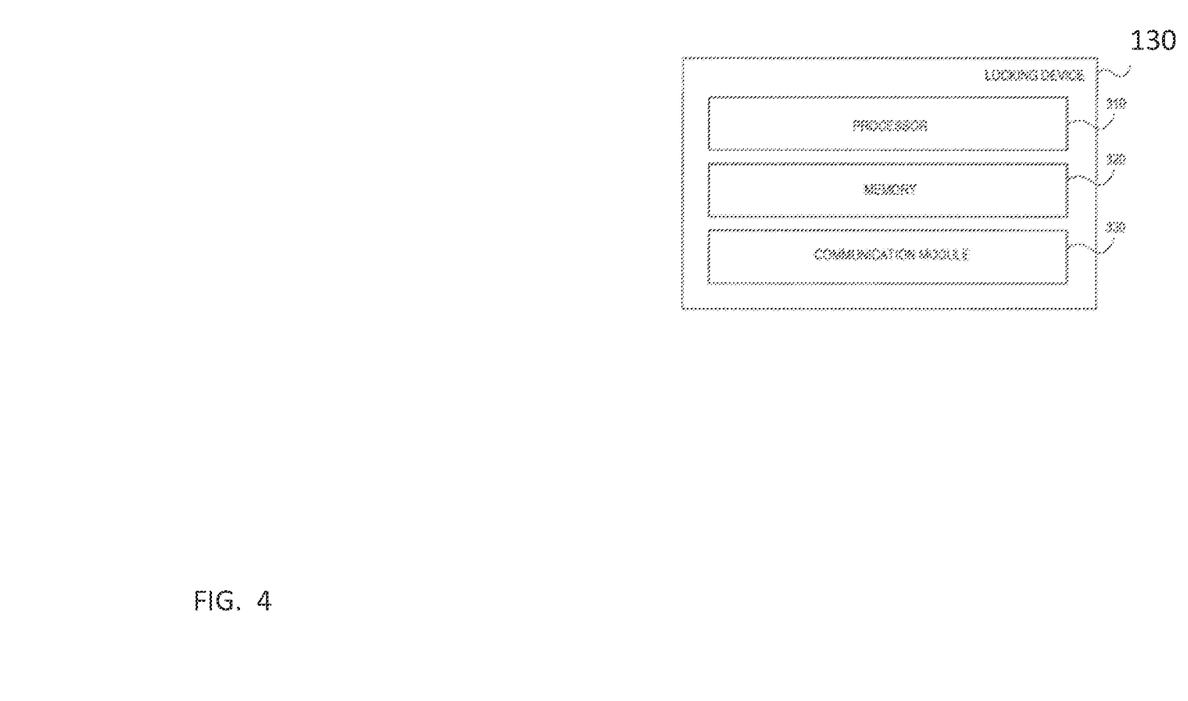
FIG. 4 depicts a locking device in an example embodiment.

FIG. 4 depicts a locking device 130 in an example embodiment. The locking device 130 can include a processor 310 communicating with a memory 320, such as electronic random access memory, or other forms of transitory or non-transitory computer readable storage mediums. Processor 310 can further communicate with communication module 330, which in turn can communicate with mobile devices via wireless signals.

Processor 310 can execute control logic and perform data processing to perform the functions and techniques as discussed herein. For example, processor 310 can be configured to verify digital certificates, for example, digital certificates that were generated by the locking device management system 100, from mobile devices received via wireless signal using communication module 330, execute locking device programming instructions, and transmit status information back to the mobile devices via wireless signal. The verification of digital certificates can include 1) checking a signature based on a cryptographic operation, 2) checking the data in the certificate/credential to make sure the data indicates that this mobile device 110 has access rights to this locking device 130, and/or 3) checking the programming data to make sure it's within bounds of acceptable parameters, etc.

In some embodiments, locking device 130 can be configured to constantly search for incoming wireless signals from mobile devices, while, in additional embodiments, locking device 130 can be configured to search for incoming wireless signals during specified periods of time.

In still further embodiments, locking device 130 can include an input that allows a user to "wake up" or activate locking device 130. After locking device 130 receives the "wake up" input, locking device 130 can begin searching for an incoming wireless signal from a mobile device. For example, locking device 130 can include a "wake up" button, or, as additional examples, locking device 130 can receive a "wake up" input by a user turning a handle attached to locking device 130, or can sense the presence of a user nearby with a presence sensor such as passive infrared sensor.

Figure 5:
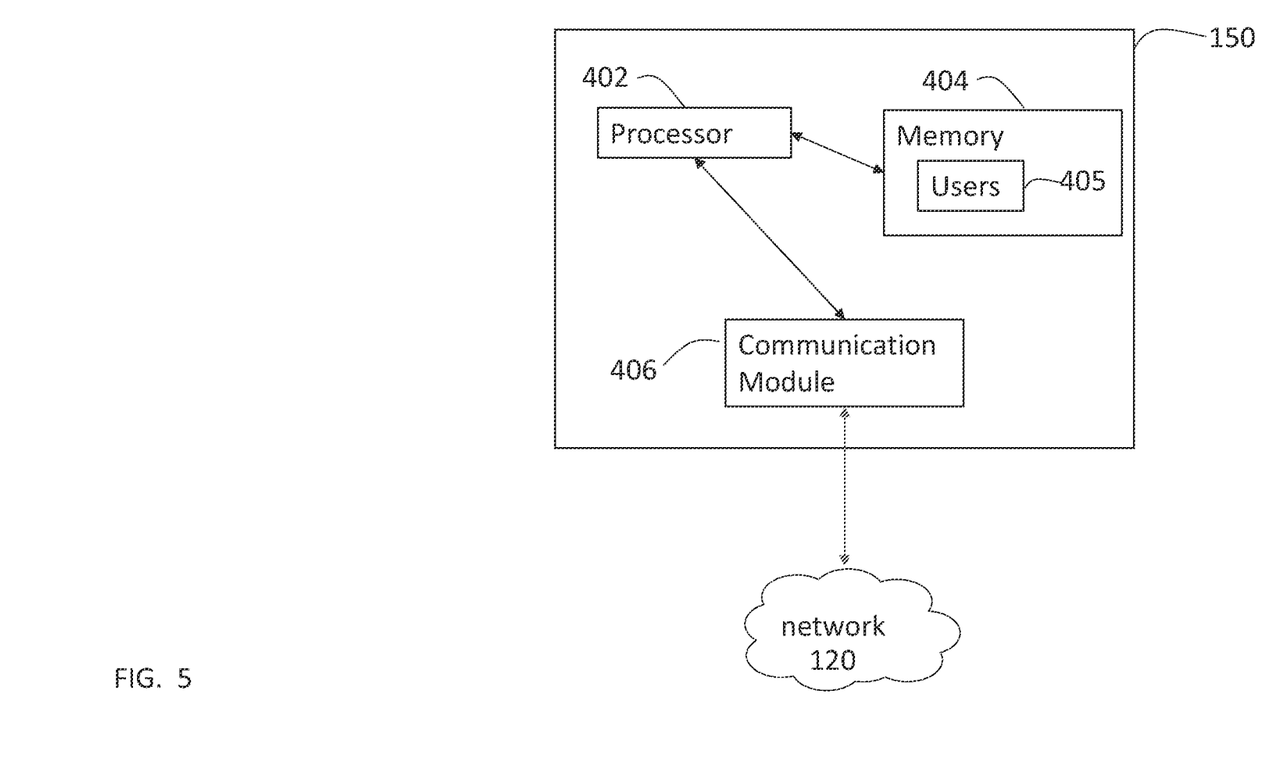
FIG. 5 depicts a language processing system in an example embodiment.

FIG. 5 depicts a language processing system 150 in an example embodiment. Language processing system 150 can include a processor 402 communicating with a memory 404, such as electronic random access memory, or other forms of transitory or non-transitory computer readable storage mediums. Memory 404 can include a user database 405. User database 405 can be utilized to identify a user 84 who has submitted a voice input 82 to the language processing system 150. As described in further detail with reference to FIG. 6, the language processing system 150 determines the user identify. If the voice input 82 relates to a locking device 130, the language processing system 150 forwards a message to the locking device management system 100 for further processing. Processor 402 can execute control logic and perform data processing to perform the functions and techniques as discussed herein. Processor 402 can be connected to, provide commands to, and receive information from communication module 406.

Figure 6:
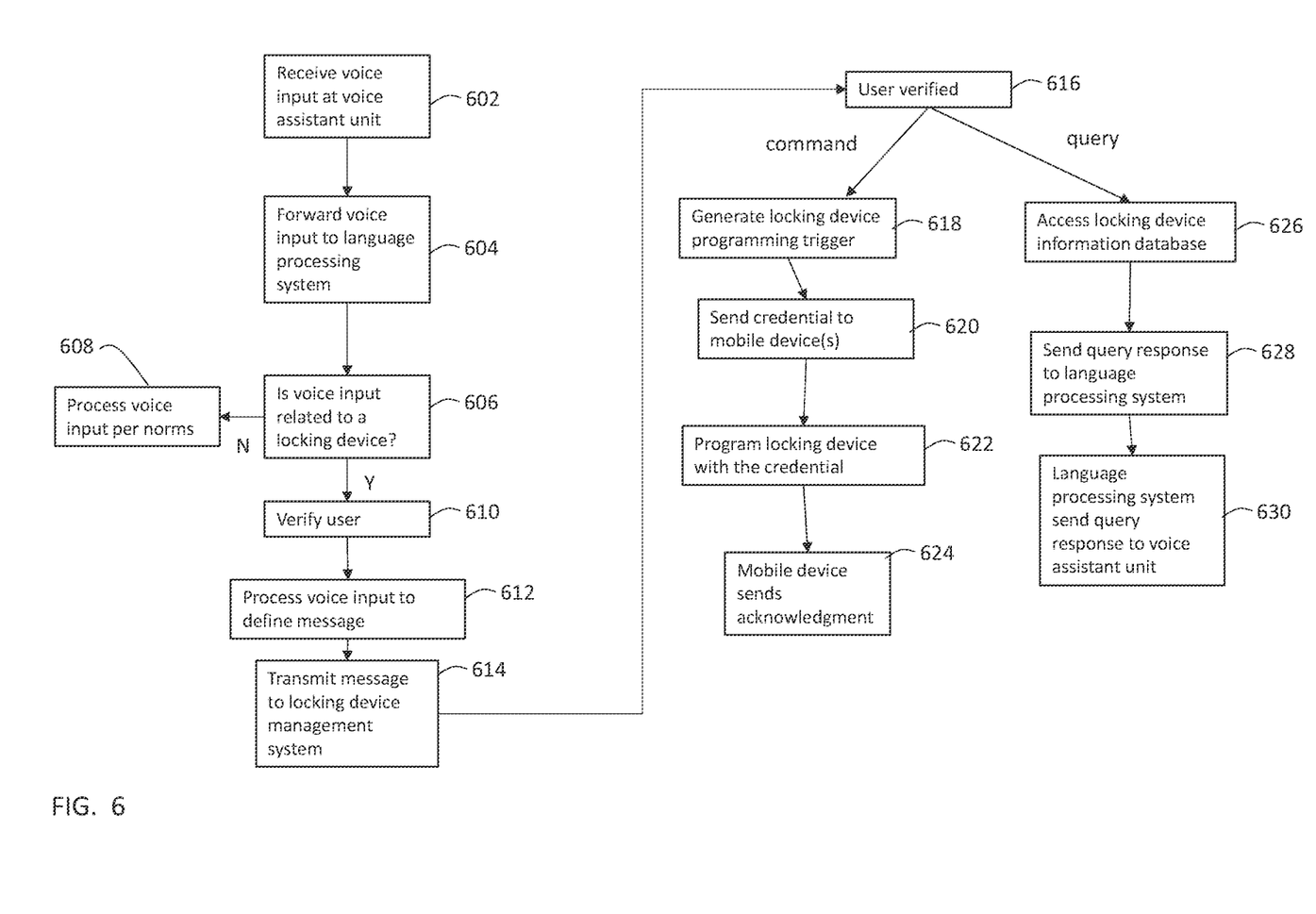
FIG. 6 depicts a flowchart for providing real estate access control in an example embodiment.

FIG. 6 depicts a flowchart for providing real estate access control in an example embodiment. FIG. 6 depicts processing by the language processing system 150 and the locking device management system 100. The process begins at 602 wherein the voice assistant unit 80 receives a voice input 82. The user 84 providing the voice input 82 may have one or more different roles. For example, the user 84 may be a real estate agent who may be generating a voice input 82 for information or action with respect to several properties including a plurality of locking devices 130 (e.g. "turn the call before showing code on at 123 main street", "tell me how many of my lock boxes are not active on properties", "which of my listings had showings today", "set the access hours on all my listings from 8 to 5", etc.). Alternatively, the user 84 may be a homeowner generating a voice input 82 for information or action with respect to their own property (e.g., what time is the next showing scheduled, please set the access hours for the home from 8 to 5, please set the do not disturb, who showed my house, how long were they here, etc.).

At 604, the voice assistant unit 80 forwards the voice input 82 to the language processing system 150 over the network 120. At 606, the language processing system 150 determines if the voice input relates to a locking device 130. The language processing system 150 may determine if the voice input 82 includes certain keywords such as lockbox, listing, street address, offer, inspection, etc. If the voice input 82 is not related to a locking device, then flow proceeds to 608 where the language processing system 150 operates per conventional processes.

If the voice input 82 relates to a locking device, flow proceeds to 610 where the language processing system 150 verifies the user 84 that generated the voice input 82. The user 84 may be verified in a number of manners. User verification may be done by associating the user 84 with a login identifier or password. In other embodiments, user verification is performed by the language processing system 150 analyzing the voice input 82 to determine a biometric of the user 84 based on the voice input 82 and verifying user identity to ensure they are the correct person. In other embodiments, the voice input 82 could include an authorizing word or pass phrase that also authenticates them as the correct person. In other embodiments, user-to-device association may be used to confirm the user 84 is associated with particular locking device(s) 130 to authorize commands. In other embodiments, programming code(s) of locking device(s) 130 are required before the voice input 82 is processed. In other embodiments, in response to the voice input 82, a request may be sent to a user mobile device for confirmation prior to processing of the voice input 82. This way anyone could give the voice input 82, but the Real Estate agent or home owner or authorized person would have to approve the voice input 82 before the processing is completed. In other embodiments, different voice inputs 82 may have different levels of authorization. Some voice inputs 82 may be allowable by anyone. Some voice inputs 82 may require an additional password. Some voice inputs 82 may require the confirming process before completion, etc.

At 612, the language processing system 150 processes the voice input to remove extraneous content and supplement additional information to form a message. The user 84 may say "Good Morning Siri, can you tell me all the showings today at my cottage at 123 Main Street." The language processing system 150 can process the voice input 82 to form a message including one or more fields including a user identifier, an action field, date field, and address field. In this example, the language processing system 150 may create a message of {MarySmith:showings:01012021:123 Main Street:Hartford:CT:06103}. It is understood that the message may include other types of fields based on the voice input 82.

At 614, the language processing system 150 forwards the message to the locking device management system 100 over network 120. At 616, the locking device management system 100 verifies the user and whether that user 84 is permitted to access information or control the locking device(s) identified in the message. If not, the locking device management system 100 will send a response to the language processing system 150 of an unauthorized access. The language processing system 150 can then send the response to the user 84 through the voice assistant unit 80.

If the user is verified at 616, the locking device management system 100 may perform various operations based on whether the message includes a command or a query. A command is an operation that changes some operation or setting of the locking device 130. A query is an operation that requests information regarding locking device(s) 130, but requires no programming of the locking device(s) 130.

If the message contains a command, flow proceeds to 618 where the locking device management system 100 produces a locking device programming trigger for one or more locking device(s) 130. The locking device management system 100 produces a credential in response to the locking device programming trigger. At 620, the credential is distributed to one or more mobile devices 110. The credential includes programming instructions/data for the locking device(s) 130.

At 622, the credential may be transferred to the locking device 130 when a mobile device 110 is in proximity to a locking device 130 (e.g., when a real estate agent is attempting to open a lock box to show a property/home to a potential buyer). The mobile device 110 communicates with the locking device 130 using radio signals (e.g., Bluetooth). At 622, the locking device 130 processes the credential to validate that it's authentic and from the locking device management system 100. Upon verifying authenticity, the locking device 130 self-updates based on the programming instructions in the credential, e.g., the locking device 130 changes its internal configuration by following the programming instructions.

Once the credential is programmed by the locking device 130, the locking device 130 will acknowledge the programming to the mobile device 110. At 624, the mobile device 110 transmits acknowledgment of programming of the credential to the locking device management system 100. The locking device management system 100 sends the acknowledgement to the language processing system 150. The language processing system 150 can then send the acknowledgement to the user 84 through the voice assistant unit 80, either at a time after programming is completed by the locking device 130 or in response to an inquiry from a user 84.

If at 616, the message includes a query (rather than a command), flow proceeds to 626 where the locking device management system 100 accesses a locking device information database 106. For example, the query may be "give me a list of all my showings today at 123 Main Street." The locking device management system 100 access the locking device information database 106 and retrieves the matching records to form a query response. At 628, the locking device management system 100 sends the query response to the language processing system 150. At 630, the language processing system 150 can then send the query response to the user 84 through the voice assistant unit 80. The language processing system 150 may convert data received from the locking device management system 100 into an audible format to be generated by the voice assistant unit 80.

Figure 7:
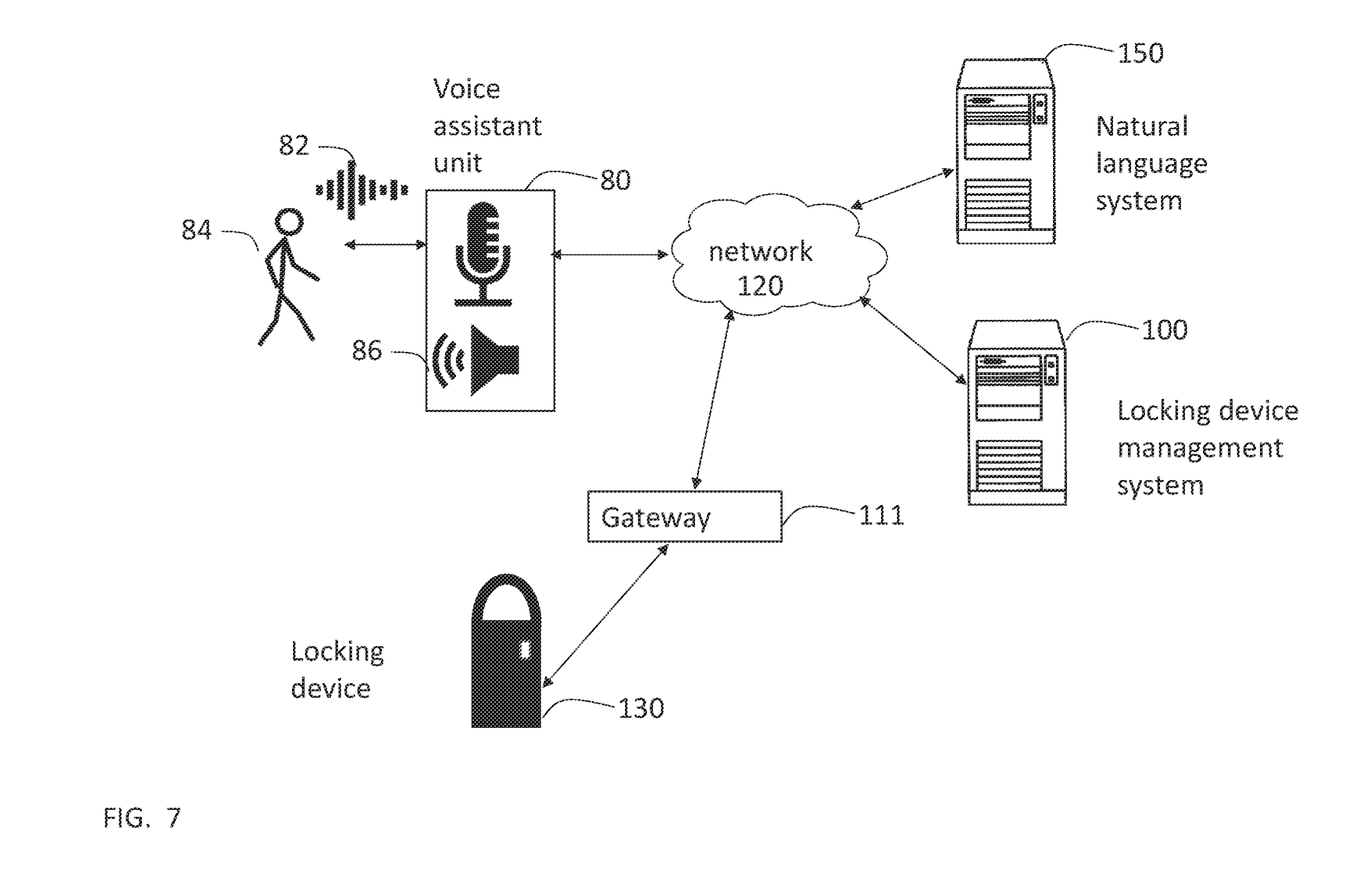
FIG. 7 depicts a system for providing real estate access control using a voice activated assistant in an example embodiment.

FIG. 7 depicts a system for providing real estate access control using a voice activated assistant in another example embodiment. In the embodiment of FIG. 7, communication with the locking device 130 is performed through a gateway 111. The gateway 111 may be located at the property where the locking device 130 is located. The gateway 111 communicates with the network 120 using, for example, a wired connection. The gateway 111 communicates with the locking device 130 using a wireless protocol (e.g. 802.11xx, Bluetooth, etc.). In the example of FIG. 7, there is no need for a mobile device 110 to be in proximity of the locking device 130 to retrieve information or install locking device programming trigger(s). The process of FIG. 6 is performed with steps 620, 622 and 624 being implemented by the locking device management system 100 communicating with the locking device 130 directly through network 120 and gateway 111.

Figure 8:
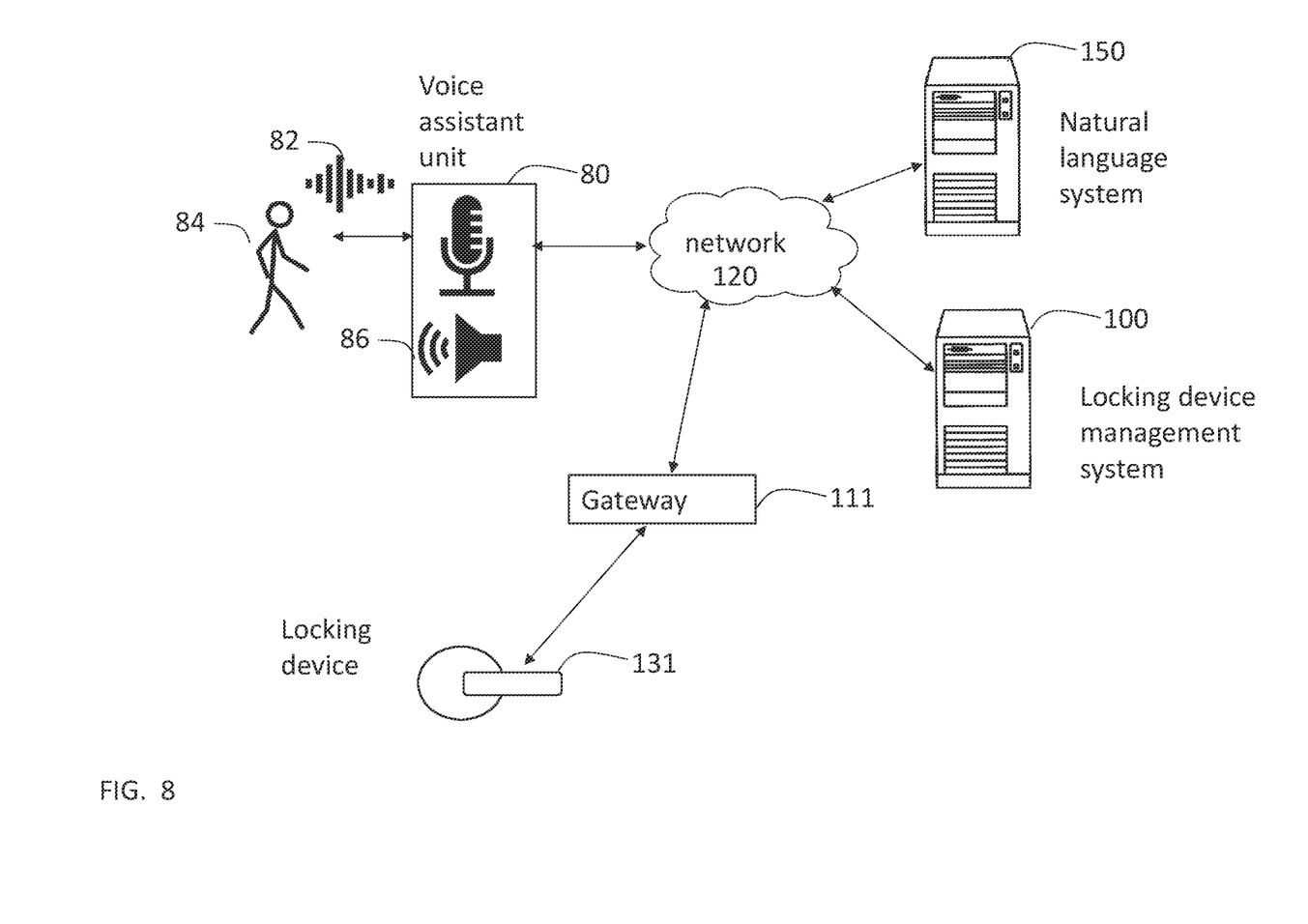
FIG. 8 depicts a system for providing real estate access control using a voice activated assistant in an example embodiment.

FIG. 8 depicts a system for providing real estate access control using a voice activated assistant in another example embodiment. The embodiment of FIG. 8 is similar to that of FIG. 7, except that locking device 130 is implemented using an electronic lock 131 (e.g., a smart lock) rather than a lockbox as shown in FIG. 7. In the example of FIG. 8, there is no need for a mobile device 110 to be in proximity of the locking device 131 to retrieve information or install locking device programming trigger(s). The process of FIG. 6 is performed with steps 620, 622 and 624 being implemented by the locking device management system 100 communicating with the locking device 131 directly through network 120 and gateway 111.

As described above, embodiments can be in the form of processor-implemented processes and devices for practicing those processes, such as a processor 102, processor 210, processor 310 and processor 402. Embodiments can also be in the form of computer program code containing instructions embodied in tangible media, such as network cloud storage, SD cards, flash drives, floppy diskettes, CD ROMs, hard drives, or any other computer-readable storage medium. Embodiments can also be in the form of computer program code transmitted over some transmission medium, such as over electrical wiring or cabling, through fiber optics, or via electromagnetic radiation. When implemented on a general-purpose microprocessor, the computer program code configure the microprocessor to create specific logic circuits.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

As described herein, in some embodiments various functions or acts may take place at a given location and/or in connection with the operation of one or more apparatuses, systems, or devices. For example, in some embodiments, a portion of a given function or act may be performed at a first device or location, and the remainder of the function or act may be performed at one or more additional devices or locations. Further, one of ordinary skill in the art will appreciate that the steps described in conjunction with the illustrative figures may be performed in other than the recited order, and that one or more steps illustrated may be optional.

Those of skill in the art will appreciate that various example embodiments are shown and described herein, each having certain features in the particular embodiments, but the present disclosure is not thus limited. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

What is claimed is:

1. A method of providing real estate access control, the method comprising:
receiving a voice input at a voice assistant unit;
sending the voice input from the voice assistant unit to a language processing system;
at the language processing system, processing the voice input to define a message;
sending the message from the language processing system to a locking device management system;
at the locking device management system, processing the message as one of a command to a locking device and a query regarding the locking device;
wherein when the message is the command to the locking device, the locking device management system generating a credential including programming for the locking device;

the locking device management system sending the credential to a mobile device;

the mobile device transferring the credential to the locking device;

the mobile device sending an acknowledgment of programming of the credential by the locking device to the locking device management system.

2. The method of claim 1 further comprising:

the locking device management system sending the acknowledgment of programming of the credential by the locking device to the language processing system.

3. The method of claim 2 further comprising:

the language processing system sending the acknowledgment of programming of the credential by the locking device to the voice assistant unit.

4. The method of claim 1 wherein:

when the message is the query regarding the locking device, the locking device management system accessing a locking device information database;

the locking device management system generating a query response in response to accessing the locking device information database.

5. A method of providing real estate access control, the method comprising:

receiving a voice input at a voice assistant unit;

sending the voice input from the voice assistant unit to a language processing system;

at the language processing system, processing the voice input to define a message;

sending the message from the language processing system to a locking device management system;

at the locking device management system, processing the message as one of a command to a locking device and a query regarding the locking device;

wherein when the message is the query regarding the locking device, the locking device management system accessing a locking device information database;

the locking device management system generating a query response in response to accessing the locking device information database;

the locking device management system sending the query response to the language processing system.

6. The method of claim 5 further comprising:

the language processing system sending the query response to the voice assistant unit.

7. A system of providing real estate access control, the system comprising:

a language processing system configured to receive a voice input from a voice assistant unit;

the language processing system configured to process the voice input to define a message;

a locking device management system configured to receive the message from the language processing system;

the locking device management system configured to process the message as one of a command to a locking device and a query regarding the locking device;

wherein when the message is the command to the locking device, the locking device management system generating a credential including programming for the locking device;

the locking device management system sending the credential to a mobile device;

the mobile device transferring the credential to the locking device;

the mobile device sending an acknowledgment of programming of the credential by the locking device to the locking device management system.

8. The system of claim 7 further comprising:

the locking device management system sending the acknowledgment of programming of the credential by the locking device to the language processing system.

9. The system of claim 8 further comprising:

the language processing system sending the acknowledgment of programming of the credential by the locking device to the voice assistant unit.

10. The system of claim 7 wherein:

when the message is the query regarding the locking device, the locking device management system accessing a locking device information database;

the locking device management system generating a query response in response to accessing the locking device information database.

11. A system of providing real estate access control, the system comprising:

a language processing system configured to receive a voice input from a voice assistant unit;

the language processing system configured to process the voice input to define a message;

a locking device management system configured to receive the message from the language processing system;

the locking device management system configured to process the message as one of a command to a locking device and a query regarding the locking device;

wherein when the message is the query regarding the locking device, the locking device management system accessing a locking device information database;

the locking device management system generating a query response in response to accessing the locking device information database;

the locking device management system sending the query response to the language processing system.

* * * * *